United States Patent
Jang

(10) Patent No.: US 7,453,814 B2
(45) Date of Patent: Nov. 18, 2008

(54) METHOD OF TRACING AND MONITORING A CALL IN A MOBILE COMMUNICATION SYSTEM

(75) Inventor: Min Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 847 days.

(21) Appl. No.: 10/628,412

(22) Filed: Jul. 29, 2003

(65) Prior Publication Data

US 2004/0023654 A1 Feb. 5, 2004

(30) Foreign Application Priority Data

Jul. 31, 2002 (KR) .................. 10-2002-0045349

(51) Int. Cl.
*H04J 1/16* (2006.01)
(52) U.S. Cl. .............. 370/241; 370/313; 709/224; 455/456.1
(58) Field of Classification Search ............. 370/252; 379/245, 247, 114; 709/224, 225; 455/410, 455/411, 414
See application file for complete search history.

(56) References Cited

U.S. PATENT DOCUMENTS

| | | | | |
|---|---|---|---|---|
| 4,942,602 | A * | 7/1990 | Baker et al. ............ | 379/212.01 |
| 5,659,881 | A * | 8/1997 | Kent ....................... | 455/520 |
| 5,959,976 | A * | 9/1999 | Kuo ........................ | 370/257 |
| 6,754,834 | B2 * | 6/2004 | Miettinen et al. ........... | 726/3 |
| 6,839,323 | B1 * | 1/2005 | Foti ........................ | 370/235 |
| 6,937,572 | B1 * | 8/2005 | Egan et al. ............... | 370/525 |
| 7,023,825 | B1 * | 4/2006 | Haumont et al. ............ | 370/338 |
| 2001/0015975 | A1 * | 8/2001 | Kikuchi ................... | 370/389 |
| 2002/0001298 | A1 * | 1/2002 | Tourunen et al. ........... | 370/349 |
| 2002/0049913 | A1 * | 4/2002 | Lumme et al. .............. | 713/201 |
| 2002/0078384 | A1 * | 6/2002 | Hippelainen .............. | 713/201 |
| 2002/0150096 | A1 * | 10/2002 | Sjoblom .................. | 370/389 |
| 2003/0063599 | A1 * | 4/2003 | Aggarwal et al. ........... | 370/352 |
| 2003/0139183 | A1 * | 7/2003 | Rantalainen .............. | 455/435 |

FOREIGN PATENT DOCUMENTS

| | | |
|---|---|---|
| CN | 1277771 A | 12/2000 |
| WO | WO 01/89145 A2 | 11/2001 |

OTHER PUBLICATIONS

Office Action issued by the Patent Office of the People's Republic of China dated Jul. 1, 2005.

* cited by examiner

*Primary Examiner*—Ricky Ngo
*Assistant Examiner*—Kan Yuen
(74) *Attorney, Agent, or Firm*—Ked & Associates, LLP

(57) ABSTRACT

Embodiments of the present invention relate to searching a mobile communication system (e.g., a cellular telephone network) for use of a network address (e.g., an Internet address). Embodiments of the invention have many advantages, as police or cellular service providers may be able to track or trace illegal Internet usage to a particular cellular telephone. For example, if a terrorist is communicating to other terrorists over the Internet, using his/her cellular telephone, the police may be able to associate the illegal Internet usage with the mobile telephone. Accordingly, in this example, the police may be able to locate the terrorists and detain him/her before they can cause harm to innocent individuals. One of ordinary skill in the art would appreciate other advantages of being able to search a mobile communication system for use of a network address.

16 Claims, 5 Drawing Sheets

METHOD OF TRACING AND MONITORING A CALL IN A MOBILE COMMUNICATION SYSTEM

This application claims the benefit of the Korean Application No. P 2002-45349 filed on Jul. 31, 2002, which is hereby incorporated by reference.

BACKGROUND OF THE INVENTION

1. Field of the Invention

Embodiments of the present invention generally relates to communications.

2. Background of the Related Art

The development of both mobile networks (e.g., cellular phone networks) and the Internet have revolutionized lifestyles of many people. However, as these technologies have developed, some criminal problems have arisen. For example, on the Internet, illegal information (e.g., terrorist communications, child pornography, and computer hacking) may be prohibited. Accordingly, police agencies may have a desire to track illegal Internet use to physical locations, so that criminals can be apprehended. If police are able to track illegal Internet use, criminal behavior and the effects of criminal behavior can be mitigated.

Mobile communications is another developing area of technology that has criminal problems. For example, cellular phones can be used by criminals to communicate during commission of a crime. Technologies have been developed to trace cellular telephone calls to mitigate crimes. Recently, Internet communication systems have been merged with cellular phones. Although there are many advantages to this merger, there may be an increase in criminal problems. For instance, a criminal can perform illegal Internet usage on a mobile phone, making it difficult for police to track the criminal and/or the location of the illegal Internet usage. Accordingly, there is a long felt need to have the ability to track Internet usage on cellular phones.

SUMMARY OF THE INVENTION

Embodiments of the present invention relate to searching a mobile communication system (e.g., a cellular telephone network) for use of a network address (e.g., an Internet address). Embodiments of the invention have many advantages, as police or cellular service providers may be able to track or trace illegal Internet usage to a particular cellular telephone. For example, if a terrorist is communicating to other terrorists over the Internet, using his/her cellular telephone, the police may be able to associate the illegal Internet usage with the mobile telephone. Accordingly, in this example, the police may be able to locate the terrorists and detain him/her before they can cause harm to innocent individuals. One of ordinary skill in the art would appreciate other advantages of being able to search a mobile communication system for use of a network address.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF PREFERRED EMBODIMENTS

As mobile Internet services are spreading with the development of data communications, illegal uses of the Internet or cyber crimes on the Internet are increasing. Accordingly, call tracing and monitoring of subscribers may be required in order to control illegal use of the Internet or cyber crimes on the Internet. Call tracing is a function of tracing a shift of a call state or a possession/release process of resources which are related to a call. Call tracing may be performed with respect to the subscribers or trunks. Information on the subscribers and the trunks subject to tracing may be registered in a call-tracing database. Call monitoring may be a function of outputting, to an operator terminal, particulars related to a call of a specified subscriber. Monitoring of the call may be required when the call is produced and registered in the same tracing database as the call tracing function.

A mobile communication switch may be divided into a packet switch and a circuit switch. A packet switch may take charge of a packet service such as an Internet connection. A circuit switch that takes charge of a service, such as an existing telephone network connection, in accordance with the kind of service. In a mobile communication network, call tracing and monitoring may be performed with respect to the circuit service and the audio-oriented call. Call tracing and monitoring may be used for call tracing and monitoring in a mobile communication system using a signaling system.

Figure 1:
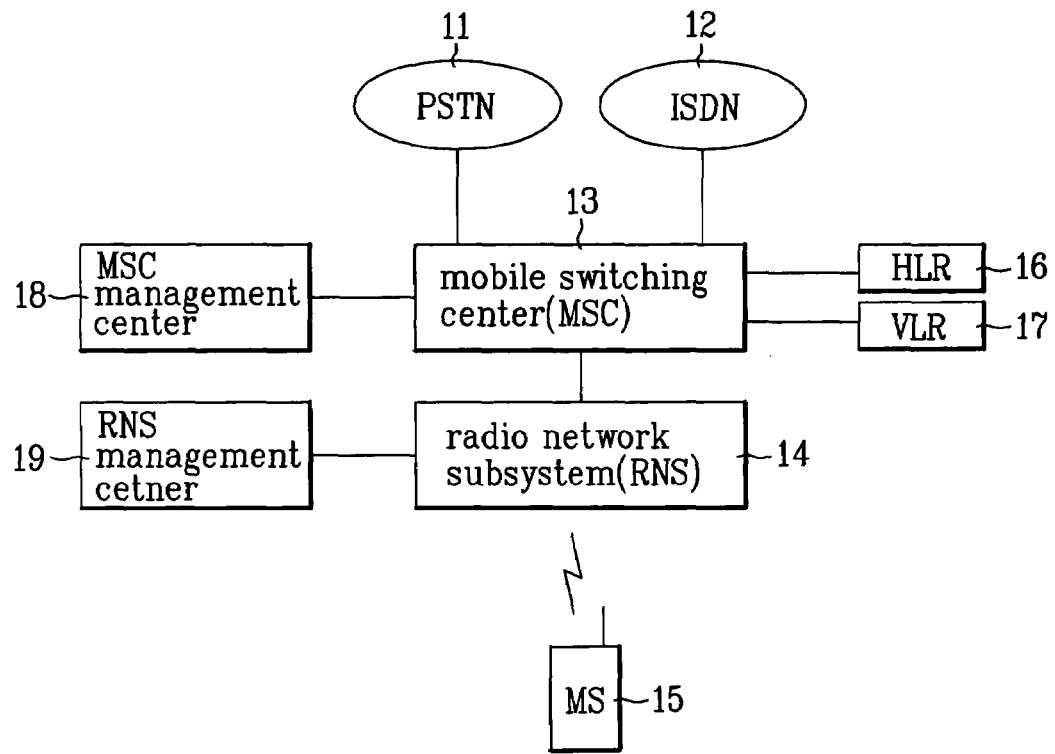
FIG. 1 is an exemplary block diagram of a circuit-type mobile communication system.

FIG. 1 is an example block diagram of a circuit-type mobile communication system The circuit-type mobile communication system may include a public switched telephone network (PSTN) 11 an integrated services digital network (ISDN) 12, a mobile switch center (MSC) 13, a radio network subsystem (RNS) 14, a mobile station (MS) 15, an hour location register (HLR) 16, a visitor location register (VLR) 17, a MSC management center 18, and an RNS management center 19. PSTN 11 may be for a general subscriber telephone service provided by a communication network provider. ISDN 12 may be for digitalizing and transmitting a communication service including a telephone service through one subscribed line.

MSC 13, which may be connected between PSTN 11 and ISDN 12, may be for performing circuit switching and exchange call processing among mobile communication subscribers so that the mobile communication subscribers can receive services. RNS 14 may be for providing allocation of radio resources and handoff functions to MS 15. HLR 16 may be for managing subscription information and position information of the mobile communication subscribers. VLR 17 may be for bringing subscriber information from HLR 16 in order to search for information for processing a call request produced from a visitor subscriber of another communication network and performing an authentication. MSC management center 18 and RNS management center 19, which may be connected to MSC 13 and RNS 14, respectively, may be for performing a call tracing and monitoring in a circuit-oriented mobile communication system.

Circuit-oriented mobile communication systems may provide wire and radio services to mobile communication subscribers using PSTN 11 and/or ISDN 12. PSTN 11 may be used for general subscriber telephone service provided by a communication network provider. ISDN 12 may be used for digitalizing and transmitting communication services including the telephone service through one subscribed line. MSC 13 may perform circuit switching and switched call processing among subscribers so that mobile communication subscribers can receive services. RNS 14 may provide allocation of radio resources and handoff function to MS 15. HLR 16 may contain two kinds of information (e.g., subscriber information and position information of mobile communication subscribers) in order to take charge of management of mobile communication subscribers. HLR 16 may designate a path of a terminating call to the MS 15. VLR 17 may bring subscriber information from HLR 16 in order to search for information for processing a call request produced from a visitor subscriber of another communication network and perform authentication.

Call tracing and monitoring may be performed by MSC management center 18 or RNS management center 19 in a circuit-oriented mobile communication system. If the number of subscribers subject to tracing and monitoring are inputted, a protocol processor of MSC 13 and/or the RNS 14 may activate call tracing and monitoring with respect to the inputted subscriber's numbers. A number may be allocated to a subscriber or a subscriber's mobile station as an identifier of a subscriber subject to call tracing and monitoring. The allocated number may be an international mobile communication subscriber identity (IMSI) or an electronic serial number (ENS).

In order to perform tracing and monitoring of a subscriber, a signal message transmitted and received at MSC 13 may be analyzed. During transmission of a signal message, a message transfer part layer2 (TP2), a message transfer part3 (MTP3), and a signal connection control part (SCCP) may be used as a protocol. By analyzing such a protocol, call tracing and monitoring of a mobile communication subscriber may be performed. A circuit type mobile communication service may allocate channels to respective subscribers who perform communications one by one. If there are many subscribers, many channels may be secured. For example, during use of the radio frequency resources as communication channels, a plurality of subscribers may not simultaneously successfully perform communications due to limited radio frequency resources.

Subscribers allocated with communication channels may not be able to continuously transmit communication data in a state that they possess the allocated channels. However, there may be a lot of idle or standby time when data is not transmitted, which may degrade efficient use of a corresponding channel. Packet type mobile communication service may enable a plurality of subscribers to simultaneously perform communication using one channel. Without additional protocols, this service may not be able to provide packet call tracing and monitoring of mobile communication subscribers who use the packet service (e.g., Internet service). Since mobile communication subscribers may not use an identifier (e.g., IMSI or ESN) in an Internet protocol network, it may become impossible to perform the call tracing and monitoring with respect to the subscribers who use only an IP address as a service identifier on the Internet. Accordingly, embodiments of the present invention relate to a mobile communication system that provides packet service and packet call tracing/monitoring. In embodiments, an IP address is used as an identifier of a mobile communication subscriber.

Figure 2:
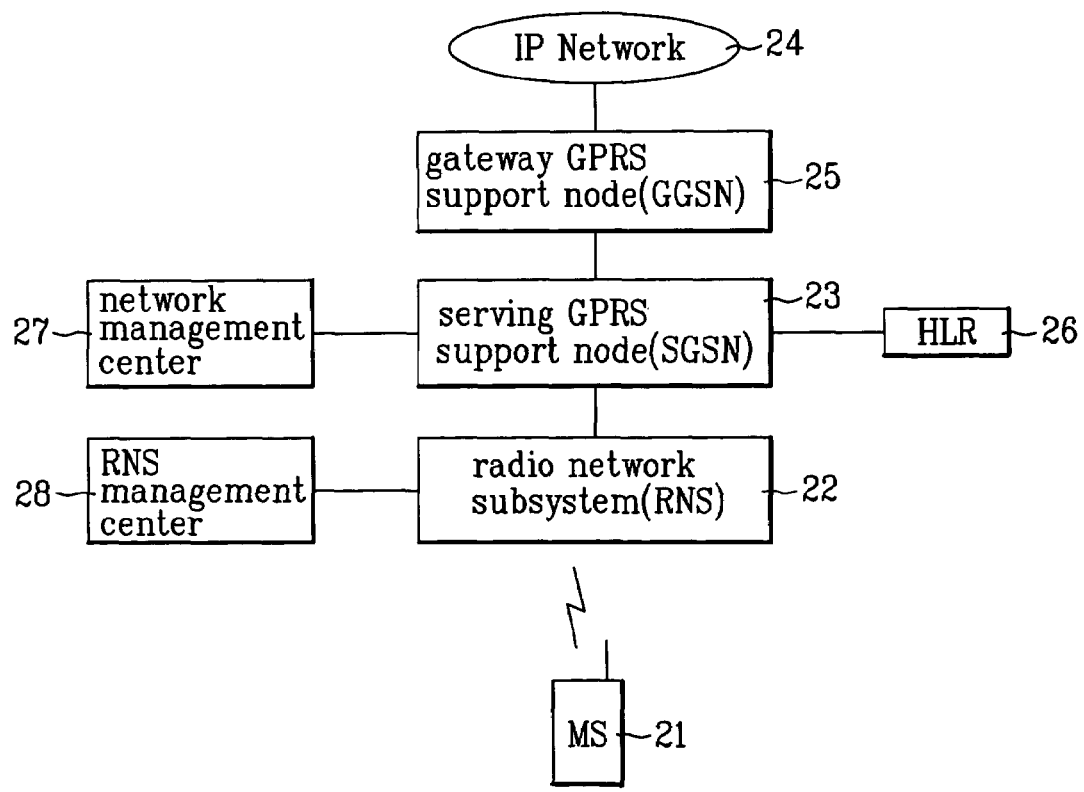
FIG. 2 is an exemplary block diagram of a packet-type mobile communication system.

FIG. 2 is an exemplary block diagram of a packet-type mobile communication system. A packet-type mobile communication system may include an Internet protocol (IP) network 24, a gateway general packet radio service GPRS support node (GGSN) 25, a serving GPRS support node 23, a radio network subsystem (RNS) 22, a home location register (HLR) 26, a network management center 27, and/or a radio network subsystem (RNS) management center 28.

GGSN 25 may perform a function of a gateway for connecting to the IP network 24. SGSN 23 may be connected to GGSN 24 through a GPRS network. GGSN 25 may manage the mobility of mobile station 21 in packet mode. GGSN 25 may perform functions of a packet switch. HLR 26 may be connected to SGSN 23 and may manage subscription information and position information of packet service subscribers. RNS 22 may manage radio resources and may perform data transmission/reception with mobile station 21 by allocating a traffic channel. Network management center 27 and RNS management center 28 may perform a packet call tracing and/or monitoring functions.

A mobile communication subscriber may receive Internet service through GGSN 25. In order for mobile station (MS) 21 to connect to an IP network, MS 21 may be assigned an IP address that is used as a service identifier on the Internet. Two methods of allocating an IP address are to allocate a static IP address in advance and to dynamically allocate an IP address in a communication network when a subscriber requests a packet call.

Figure 3:
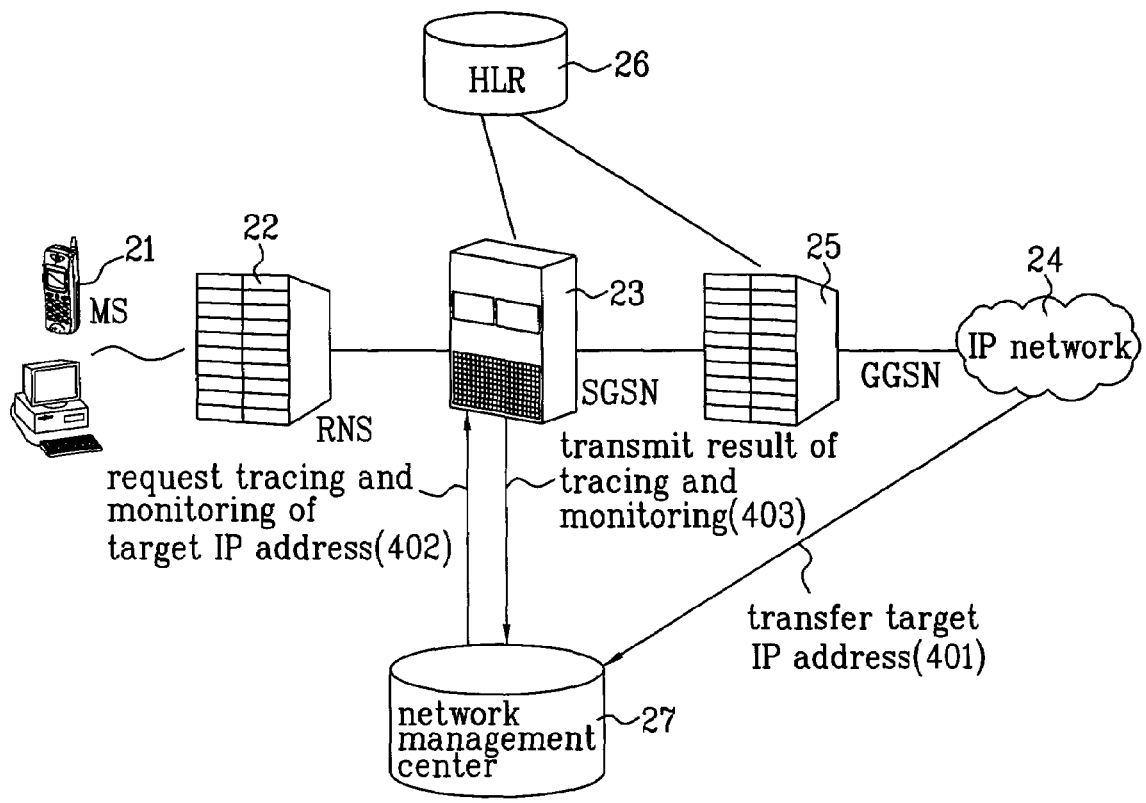
FIG. 3 is an exemplary view illustrating a signal transmitting/receiving process among blocks in the packet-type mobile communication system.
Figure 4:
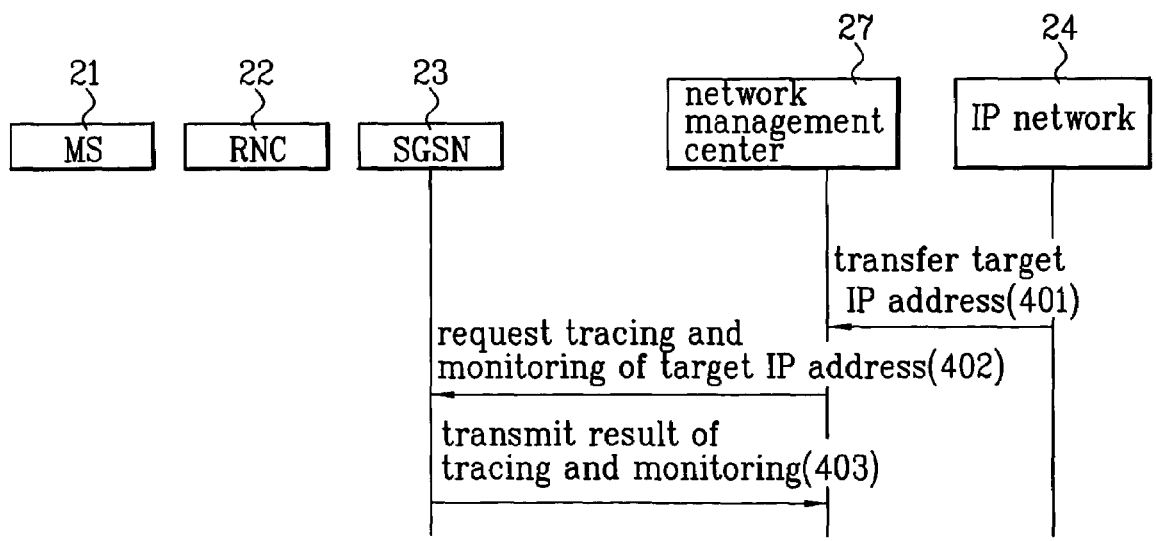
FIG. 4 is an exemplary view illustrating a signal flow.

Embodiments of the present invention relate to tracing and monitoring a packet call of a mobile communication subscriber. FIG. 3 is an exemplary view illustrating a signal transmitting/receiving process among blocks in a packet-type mobile communication system according to embodiments of the present invention. FIG. 4 is an exemplary view illustrating a signal flow according to embodiments of the present invention.

If illegal use of the Internet or a cyber crime is detected on IP network 24, a National Police Agency or a similar agency may transfer information to the network management center 27 relating to a target IP address for tracing and monitoring (step 401). Network management center 27 may request tracing and monitoring of the target IP address to SGSN 23 (step 402). SGSN 23, which may have received a request for tracing and monitoring, may perform tracing and monitoring of the target IP address and transmit results of the target IP address tracing and monitoring to network management center 27 (step 403). Accordingly, tracing and monitoring of a mobile communication subscriber may be possible.

Figure 5:
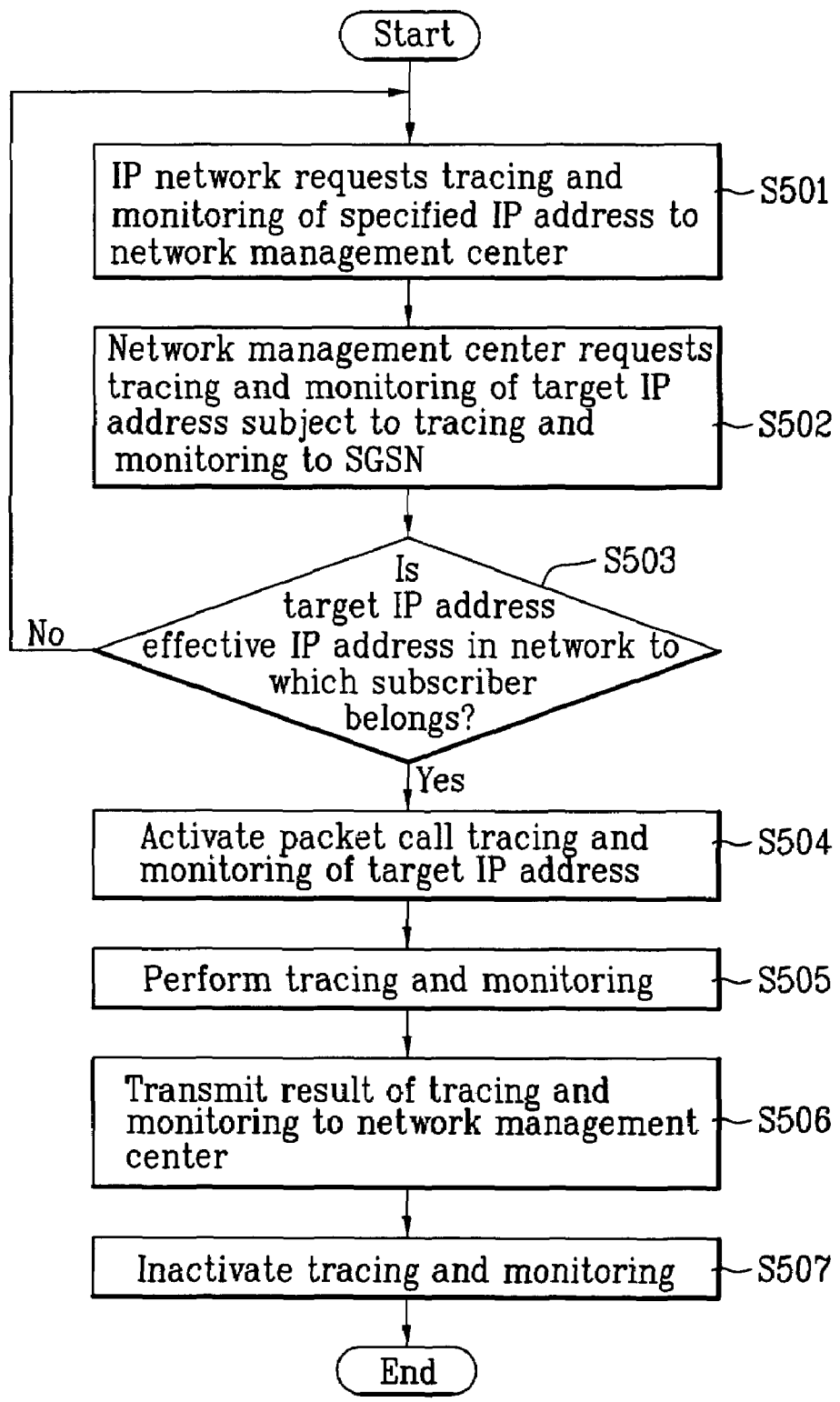
FIG. 5 is an exemplary flowchart illustrating a packet call tracing and monitoring operation.

FIG. 5 is a flowchart illustrating a packet call tracing and monitoring operation according to embodiments of the present invention. If a specified IP address is illegally used on an IP network and a request for tracing and monitoring of the specified IP address is transferred from a policing agency to network management center 27 (step S501), then network management center 27 may request SGSN 23 to activate tracing and monitoring of a target IP address (step S502).

SGSN 23, responsive to receiving a tracing and monitoring activation request message, may check whether a target IP address is an effective IP address in a network to which the subscriber belongs (step S503). If it is confirmed that the target IP address is not an effective IP address in the network, SGSN 23 may return the system to a state before the request for tracing and monitoring of the corresponding target IP address is produced in the IP network so that the request for tracing and monitoring of the corresponding target IP address is ignored. If it is confirmed that the target IP address is the effective IP address, then SGSN 23 may activate call tracing and monitoring of the target IP address (step S504). SGSN 23 may then perform packet call tracing and monitoring of the target IP address (step S505).

Performing packet call tracing and monitoring (step S505) may include checking for a request and change of packet call, a request for release of a packet call, or other protocols which involve messages transmitted between SGSN 23 and mobile station (MS) 21. SGSN 23 may collect and periodically transmit to network management center 27 results obtained through packet call tracing and monitoring (step S506). SGSN 23 may inactivate tracing and monitoring functions (step S507) to complete packet call tracing and monitoring.

Figure 6:
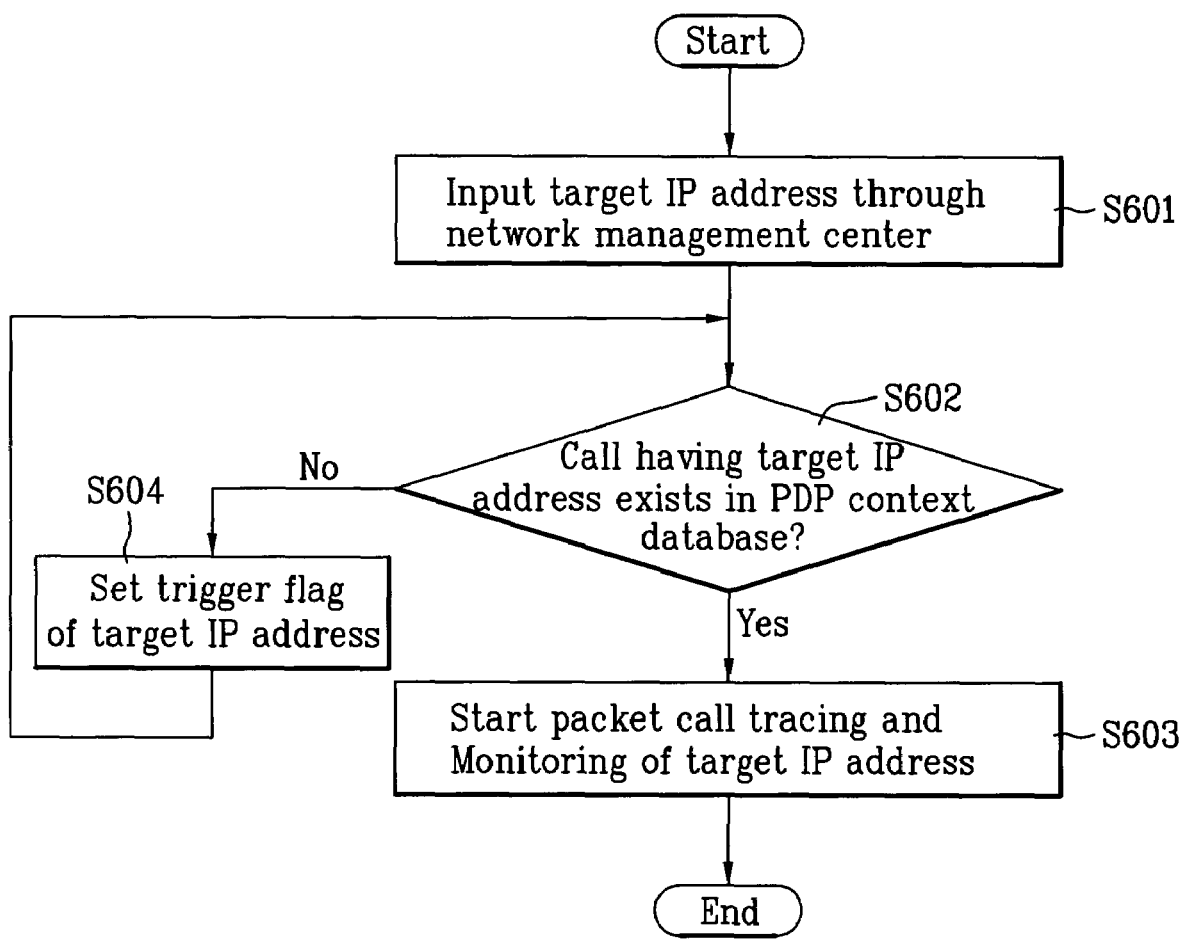
FIG. 6 is an exemplary flowchart illustrating activating packet call tracing and monitoring.

FIG. 6 is an exemplary flowchart illustrating activating packet call tracing and monitoring of a target IP address of FIG. 5. If a target IP address subject to activation of the tracing and monitoring is input into SGSN 23 through an operator terminal of network management center 27 (step S601), SGSN 23 may check whether a packet call having the target IP address exists in a packet data protocol (PDP) context database stored of SGSN 23 (step S602). If it is confirm that a packet call having a target IP exists in a PDP context database, SGSN 23 may start packet call tracing and monitoring of the target IP address (step S603).

If it is determined that a packet call having a target IP address does not exist in a PDP context database, then SGSN 23 may set a trigger flag for the target IP (step S604) in order to trace and monitor the packet call. SGSN 23 may check whether a packet call having the IP address included in the trigger flag exists in the PDP context database (step S602). If it is confirmed that a packet call having the IP address included in the trigger flag exists in the PDP context database, then SGSN 23 may start packet call tracing and monitoring of the IP address (step S603). Packet call tracing and monitoring may be performed for messages transmitted between SGSN 23 and mobile station (MS) 21.

For example, a message transmitted between SGSN 23 and mobile station (MS) 21 may be an active PDP context request message that is transmitted from the mobile station 21 to the SGSN 23 or an active PDP context acceptance message that is transmitted from the SGSN 23 to the mobile station 21. An IP address may be used as an identifier of such messages. SGSN 23 may collect and periodically transmit results of packet call tracing and monitoring to network management center 27.

Figure 7:
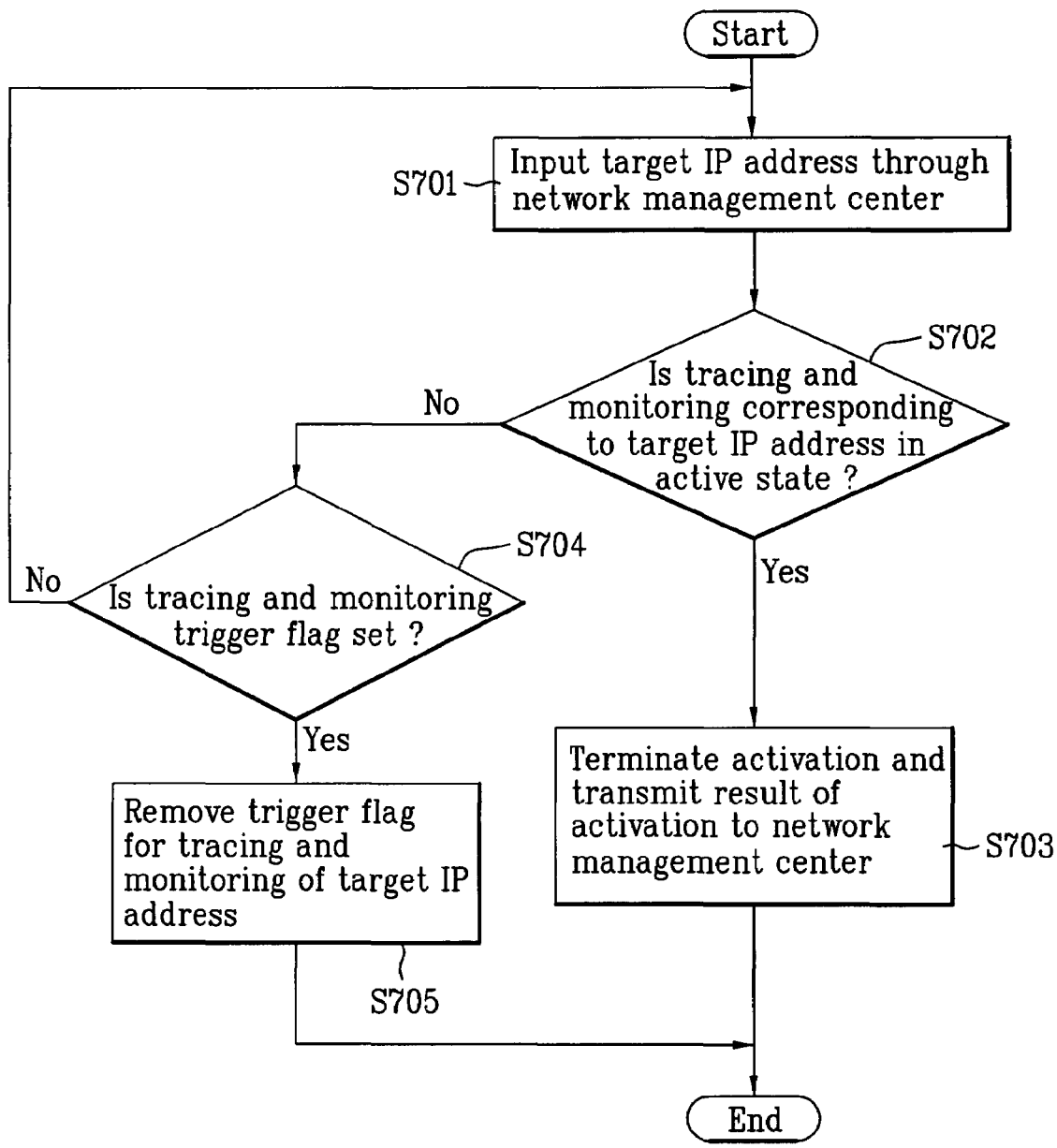
FIG. 7 is an exemplary flowchart illustrating inactivating packet call tracing and monitoring.

FIG. 7 is an exemplary flowchart illustrating inactivating packet call tracing and monitoring of FIG. 5. If a target IP address subject to inactivation of tracing and monitoring is inputted into SGSN 23 through an operator terminal of network management center 27 (step S701), SGSN 23 may determine whether tracing and monitoring of the target IP address is in an active state or in an inactive state (step S702). If it is determined that tracing and monitoring of a target IP address is in an active state, then SGSN 23 may terminate the activation and transmit results of the inactivation to an operator terminal of network management center 27 (step S703).

If it is determined that call tracing and monitoring of a target IP address is in an inactive state, then SGSN 23 may determine whether a trigger flag for tracing and monitoring of the target IP address is set (step S704). If it is determined that a trigger flag is set, SGSN 23 may remove the trigger flag (step S705) and may terminate tracing and monitoring. The trigger flag may be removed to prevent errors if a packet call of the trigger IP address exists in a PDP context database. If it is determined that a trigger flag for packet call tracing and monitoring of a target IP address is not set, SGSN 23 may return the mobile communication system to a state before a target IP address subject to the inactivation was inputted to network management center 27. In embodiments of the present invention, a function of SGSN 23 may be performed by GGSN 25. Operation and effect of other function blocks of GGSN 25 may be similar to SGSN 23.

In embodiments of the present invention, packet call tracing and monitoring in a mobile communication system may have several advantages. For example, if it is required to trace and monitor a packet call of a mobile communication subscriber who has connected to the Internet, embodiments of present invention may perform the packet call tracing and monitoring using the IP address of subscriber. Accordingly, because illegal use of the Internet or cyber crimes on the Internet are increasing with the spread of mobile Internet services, it may be possible to perform tracing and monitoring of a packet subscriber in order to control the illegal use of the Internet or the cyber crime on the Internet.

Embodiments of the present invention relate to a method of tracing and monitoring a call in a mobile communication system. An object of embodiments of the present invention is to provide a method of tracing and monitoring a call in a mobile communication system that enables the tracing and monitoring of a packet call of a mobile communication subscriber. A method of tracing and monitoring a call in a mobile communication system according to embodiments of the present invention performs the tracing and monitoring of the packet call of the mobile communication subscriber using an Internet protocol (IP) of an Internet subscriber.

Embodiments relate to a method of tracing and monitoring a call in a mobile communication system provided with a network management center and a serving general packet radio service (GPRS) support node (SGSN), includes a first step of a related agency transmitting a target Internet protocol (IP) subject to a request for tracing and monitoring to the network management center of the mobile communication system, a second step of the network management center requesting a packet call tracing and monitoring of the target IP to the SGSN, and a third step of the SGSN tracing and monitoring the packet call of the target IP and transmitting a result of the packet call tracing and monitoring to the network management center.

In embodiments, the third step includes the steps of checking whether the target IP is an effective IP in a network to which the corresponding subscriber belongs, if it is checked that the target IP is the effective IP, activating the call tracing and monitoring of the target IP, and performing the packet call tracing and monitoring and transmitting the result of the packet call tracing and monitoring.

The method of tracing and monitoring the call according to embodiments of the present invention further includes the step of if it is checked that the target IP is not the effective IP in the network to which the corresponding subscriber belongs, returning the system to a state before the request for tracing and monitoring of the target IP is produced in the IP network. In embodiments, the step of activating the packet call tracing and monitoring of the target IP includes the steps of the SGSN judging whether the packet call having the target IP exists in a packet data protocol context database stored in the SGSN, and if it is judged that the packet call having the target IP exists in the packet data protocol context database, starting the packet call tracing and monitoring of an address of the target IP.

In embodiments, the step of activating the call tracing and monitoring of the target IP further includes the steps of if it is judged that the packet call having the target IP does not exist in the packet data protocol context database, setting a trigger flag of the target IP address, and if the packet call having an IP with the set trigger flag exists in the packet data protocol context database, starting the packet call tracing and monitoring of the corresponding IP. In embodiments, the step of performing the packet call tracing and monitoring is a step of the SGSN checking whether a request and change of the packet call, a request for release of the packet call, etc., are produced with respect to a message that the SGSN transmits to and receives from a mobile station.

In embodiments, the message that the SGSN transmits to and receives from the mobile station may include an active PDP context request message that is transmitted from the mobile station to the SGSN and an active PDP context request response message that is transmitted from the SGSN to the mobile station. In embodiments, at the third step, the SGSN periodically transmits the result of the packet call tracing and monitoring to the network management center.

The method of tracing and monitoring the call according to embodiments of the present invention further includes a fourth step of the SGSN inactivating the packet call tracing and monitoring after the third step. The fourth step of inactivating the packet call tracing and monitoring of the target IP includes the steps of the SGSN receiving input of the target IP subject to inactivation through the network management center, checking whether the packet call tracing and monitoring of the target IP is in an active state, and if it is checked that the packet call tracing and monitoring of the target IP is in the active state, terminating the activation and transmitting a result of the inactivation.

In embodiments, the fourth step of inactivating the packet call tracing and monitoring of the target IP further includes the steps of if it is checked that the packet call tracing and monitoring corresponding to the target IP is in an inactive state, checking whether a trigger flag for the tracing and monitoring of the target IP is set, and if it is checked that the trigger flag is set, removing the trigger flag and terminating the tracing and monitoring work. The fourth step of inactivating the packet call tracing and monitoring of the target IP further includes the step of if it is checked that the trigger flag for the call tracing and monitoring of the target IP is not set, returning the mobile communication system to a state before an address of the target IP subject to inactivation is inputted to the network management center.

In embodiments of the present invention, a method of tracing and monitoring a call in a mobile communication system provided with a network management center and a gateway general packet radio service (GPRS) support node (GGSN), includes a first step of a related agency transmitting a target Internet protocol (IP) subject to a request for tracing and monitoring to the network management center of the mobile communication system, a second step of the network management center requesting a packet call tracing and monitoring of the target IP to the GGSN, and a third step of the GGSN tracing and monitoring the packet call of the target IP and transmitting a result of the packet call tracing and monitoring to the network management center.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method of searching for information in a mobile communication system, comprising:
   determining if a target IP address is an effective address;
   if the target IP address is an effective address, determining if a packet call corresponding to the target IP address exists in a packet data protocol context database;
   if the target IP address does not exist in the packet data protocol (PDP) context database, setting a trigger flag for the target IP address; and
   performing at least one of a tracing or monitoring operation for the packet call of target IP address based on the set trigger flag, said method further comprising deactivating the tracing or monitoring operation after a predetermined period of time, said deactivating including:
   checking whether the tracing or monitoring operation is in an active state; and
   if the tracing or monitoring operation is in the active state, terminating activation and transmitting a result of the inactivation, wherein if the tracing or monitoring operation is in an inactive state, checking whether a trigger flag for tracing or monitoring the packet call of target IP address is set, and if the trigger flag is set removing the trigger flag and terminating the tracing or monitoring operation for the packet call of target IP address.

2. The method of claim 1, wherein the internet protocol address is one of:
   a static internet protocol address; or
   a dynamically allocated internet protocol address.

3. The method of claim 1, wherein said searching is responsive to a request from a network management center including identification of the network address.

4. The method of claim 3, wherein the request from the network management center is responsive to a request from an internet protocol network including identification of the network address.

5. The method of claim 1, wherein if it is determined that the target IP address exists in the packet data protocol context database, then performing at least one of tracing and monitoring of the packet call or the target IP address without setting said trigger flag for the target IP address.

6. The method of claim 1, further comprising: transmitting results of said at least one of tracing and monitoring the target IP address.

7. The method of claim 6, wherein said transmitting is to a network management center.

8. The method of claim 1, wherein a serving GPRS support node implements one or more of the determining, setting, or performs steps.

9. The method of claim 1, wherein a gateway GPRS support node implements one or more of the determining, setting, or performs steps.

10. An apparatus comprising:
    an interface to an internet protocol network; and
    a means for tracing or monitoring a packet call of a mobile communication subscriber who has connected to the internet protocol network through the interface, wherein said means includes a processing circuit to:
    check if a target IP address is an effective address;
    if the target IP address is an effective address, determining if a packet call corresponding to the target IP address exists in a packet data protocol context database;
    if the target IP address does not exist in the packet data protocol (PDP) context database, setting a trigger flag for the target IP address and tracing or monitoring the packet call based on the set trigger flag, said processing circuit further deactivating the packet call tracing or monitoring after a predetermined period of time, said deactivating including:

checking whether a tracing or monitoring operation for the packet call is in an active state, if the tracing or monitoring operation is in the active state, terminating activation and transmitting a result of the inactivation, and wherein if the tracing or monitoring operation is in an inactive state, checking whether a trigger flag for tracing or monitoring the packet call is set, and if the trigger flag is set removing the trigger flag and terminating tracing or monitoring of the packet call.

11. A method of tracing or monitoring a call in a mobile communication system provided with a network management center and a serving general packet radio service (GPRS) support node (SGSN), the method comprising:

transmitting a target Internet protocol (IP) address subject to a request for tracing or monitoring to the network management center of the mobile communication system;

requesting packet call tracing or monitoring of the target IP address to the SGSN;

tracing or monitoring, in the SGSN, the packet call of the target IP address; and transmitting a result of the packet call tracing or monitoring to the network management center, wherein said tracing or monitoring includes:

checking whether the target IP address is an effective IP address in a network to which a corresponding subscriber belongs; and if it is checked that the target IP address is the effective IP address, activating the call tracing or monitoring of the target IP address, said method further comprising:

deactivating the packet call tracing or monitoring after a predetermined period of time, said deactivating including:

receiving input of the target IP address subject to inactivation through the network management center;

checking whether the packet call tracing or monitoring of the target IP address is in an active state; and if it is checked that the packet call tracing or monitoring of the target IP address is in the active state, terminating the activation and transmitting a result of the inactivation, and wherein:

if it is checked that the packet call tracing or monitoring corresponding to the target IP address is in the inactive state, checking whether a trigger flag for the tracing and monitoring of the target IP is set; and if it is checked that the trigger flag is set, removing the trigger flag and terminating tracing or monitoring of the packet call of the target IP address.

12. The method of claim 11, further comprising:

if it is checked that the target IP address is not the effective IP address in the network to which the corresponding subscriber belongs, returning the system to a state before the request for tracing and monitoring of the target IP address is produced in the IP network.

13. The method of claim 11, wherein activating the packet call tracing and monitoring of the target IP address comprises:

judging whether the packet call having the target IP address exists in a packet data protocol context database stored in the SGSN; and if it is judged that the packet call having the target IP address exists in the packet data protocol context database, starting the packet call tracing or monitoring of the target IP address.

14. The method of claim 11, wherein performing the packet call tracing or monitoring includes at least one of:

checking whether a request or change of the packet call has occurred, checking whether a request for release of the packet call has been made; or checking whether a protocol which involves one or more messages have been transmitted between the SGSN and a mobile station.

15. The method of claim 14, wherein the one or more messages transmitted between the SGSN and the mobile station includes at least one of an active packet data protocol (PDP) context request message that is transmitted from the mobile station to the SGSN or an active PDP context request response message that is transmitted from the SGSN to the mobile station.

16. The method of claim 11, wherein inactivating the packet call tracing or monitoring of the target IP address further comprises:

if it is checked that the trigger flag for the call tracing and monitoring of the target IP address is not set, returning the mobile communication system to a state that existed before an address of the target IP address subject to inactivation is inputted to the network management center.

\* \* \* \* \*